US006973301B1

(12) United States Patent
Contino et al.

(10) Patent No.: US 6,973,301 B1
(45) Date of Patent: Dec. 6, 2005

(54) SYSTEM FOR ALTERING OPERATIONAL ASPECTS OF A MOBILE ELECTRONIC DEVICE BASED UPON LOCATION

(75) Inventors: Jeffrey R. Contino, Lawrenceville, GA (US); Brian M. Anderson, Suwanee, GA (US); Joseph E. Jones, Jr., Suwanee, GA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 592 days.

(21) Appl. No.: 10/042,866

(22) Filed: Jan. 8, 2002

(51) Int. Cl.[7] .......................... H04M 3/00; H04B 1/38
(52) U.S. Cl. .................... 455/419; 455/90.2; 455/566
(58) Field of Search .................... 455/419, 456.1, 455/456.2, 569.1, 569.2, 567, 414.1, 90; 340/311.1; 320/113; 361/814

(56) References Cited

U.S. PATENT DOCUMENTS

| 5,353,017 | A | * | 10/1994 | Suzuki et al. ............... 340/7.37 |
| 5,459,773 | A | * | 10/1995 | Hwang ....................... 340/7.31 |
| 5,481,506 | A | * | 1/1996 | Kita ............................ 368/10 |
| 5,603,101 | A | * | 2/1997 | Choi ........................... 455/566 |
| 6,191,553 | B1 | * | 2/2001 | Feng-Jung .................. 320/113 |
| 6,377,825 | B1 | * | 4/2002 | Kennedy et al. .......... 455/569.2 |
| 6,408,187 | B1 | * | 6/2002 | Merriam ....................... 455/458 |
| 6,600,662 | B1 | * | 7/2003 | Emmert et al. ............... 361/814 |
| 6,650,894 | B1 | * | 11/2003 | Berstis et al. ............... 455/420 |
| 6,697,645 | B1 | * | 2/2004 | MacFarlane ................ 455/566 |
| 6,792,263 | B1 | * | 9/2004 | Kite ........................ 455/412.1 |
| 2002/0049818 | A1 | * | 4/2002 | Gilhuly et al. .............. 709/206 |
| 2002/0137552 | A1 | * | 9/2002 | Cannon et al. .............. 455/567 |
| 2002/0173295 | A1 | * | 11/2002 | Nykanen et al. ............ 455/414 |
| 2002/0193080 | A1 | * | 12/2002 | Komsi et al. ................. 455/90 |
| 2003/0112182 | A1 | * | 6/2003 | Bajikar ....................... 342/457 |

* cited by examiner

*Primary Examiner*—William Trost
*Assistant Examiner*—Kiet Doan
(74) *Attorney, Agent, or Firm*—Needle & Rosenberg, P.C.

(57) ABSTRACT

A system for altering an operational aspect of a mobile electronic device based on the location of the device and the proximity of the device to certain components is disclosed. The invention provides a system for altering an operational aspect of a mobile electronic device, comprising a sensor associated with the mobile electronic device and a mating element associated with the sensor. The sensor is configured to develop a unique signal based on the mating element and the proximity of the mobile electronic device to the mating element. The invention also includes logic configured to receive the signal from the sensor and alter a characteristic of the mobile electronic device based on the received sensor signal.

32 Claims, 3 Drawing Sheets

SYSTEM FOR ALTERING OPERATIONAL ASPECTS OF A MOBILE ELECTRONIC DEVICE BASED UPON LOCATION

BACKGROUND OF THE INVENTION

1. Technical Field

This invention relates generally to mobile electronic devices, and, more particularly, to a system for altering operational aspects of a mobile electronic device depending on the location of the device.

2. Related Art

With the increasing availability of efficient, low cost electronic modules, mobile electronic devices are becoming more and more widespread. For example, the general availability and ease of use of personal digital assistants (PDAs) and portable communication devices, such as wireless telephones, are making these devices more and more popular. Some of the issues surrounding the use of these mobile electronic devices are the user interface (the manner in which the user interacts with the device) and the manner in which the device operates based on a given input from the user.

For example, one or more operational aspects of the user interface (sometimes called a graphical user interface (GUI) if implemented using graphical icons) can be based on the operating environment selected by the user. Similarly, the operation of other aspects of the device, such as the amount of radio frequency (RF) energy emitted from the device, if the device is a portable transceiver device, may be dictated by the location of the device and by the manner in which the device is used. For example, the device may be permitted to emit higher RF energy if carried at the waist (for example, in a belt clip) of an individual than if held to the individual's ear. Unfortunately, these and other operational aspects of conventional mobile electronic devices cannot easily be altered based on the location of the device, and generally cannot be altered by the user of the device.

Therefore, there is a need for a mobile communication device that overcomes the deficiencies and inadequacies stated above.

SUMMARY

The invention provides a system for altering an operational aspect of a mobile electronic device based on the location of the device and the proximity of the device to certain components. The invention provides a system for altering an operational aspect of a mobile electronic device, comprising a sensor associated with the mobile electronic device and a mating element associated with the sensor. The sensor is configured to develop a signal based on the mating element. The invention also includes logic configured to receive the signal from the sensor and alter a characteristic of the mobile electronic device based on the received sensor signal.

Related methods of operation and computer readable media are also provided. Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The invention can be better understood with reference to the following figures. The components within the figures are not necessarily to scale relative to each other, emphasis instead being placed upon clearly illustrating the principles of the invention. Moreover, in the figures, like reference numerals designate corresponding parts throughout the different views.

DETAILED DESCRIPTION OF THE PREFERRED EMBODIMENT

Figure 1:
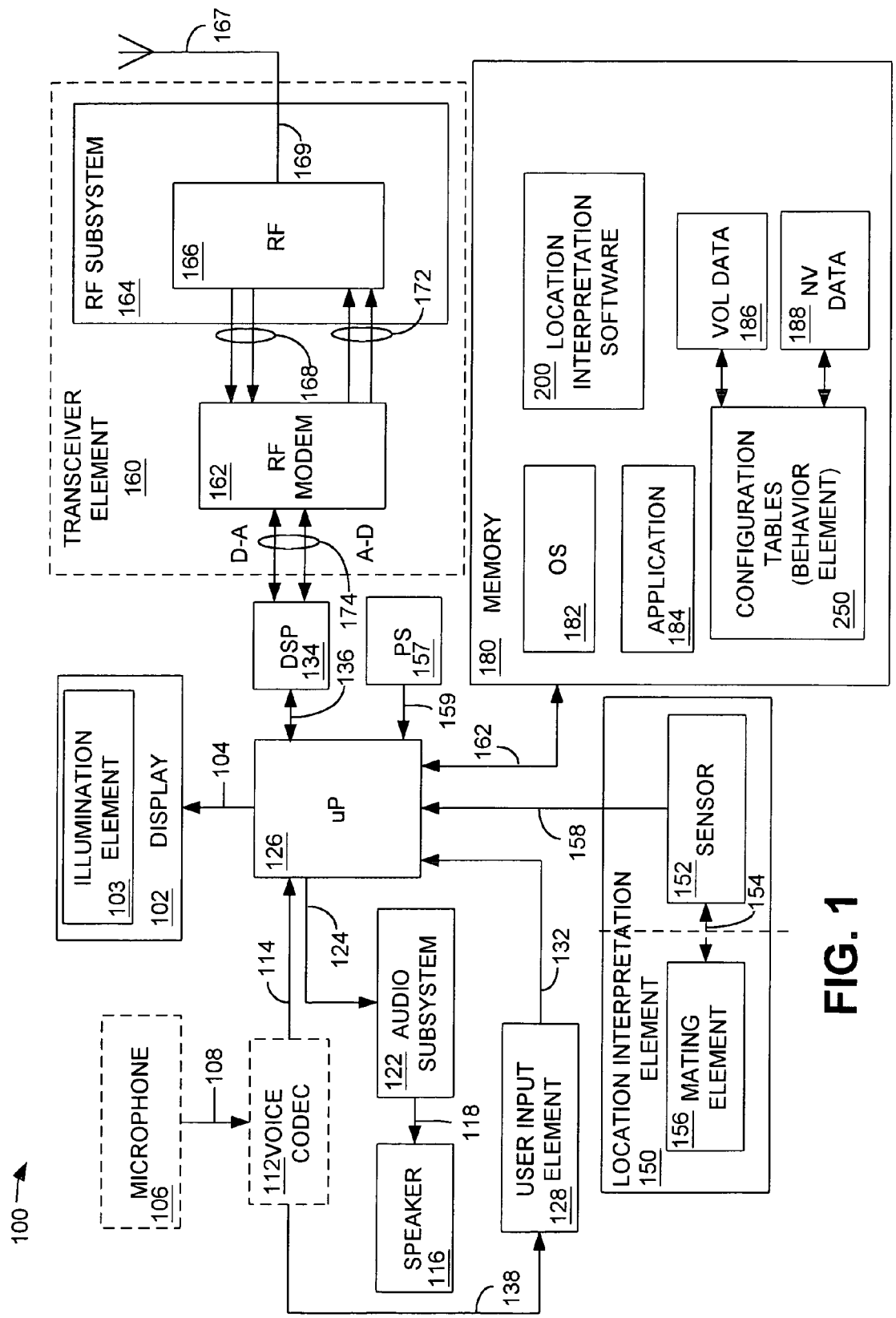
FIG. 1 is a block diagram illustrating a mobile electronic device constructed in accordance with the invention.

While described below as being particularly applicable to a portable communication handset, such as a cellular-type telephone, or a personal digital assistant (PDA), the system for altering one or more operational aspects of a mobile electronic device is applicable to any mobile electronic device in which it is desirable to alter an operational aspect of the device based upon the location or operating environment of the device.

The system for altering an operational aspect of a mobile electronic device can be implemented in software, hardware, or a combination thereof. In a preferred embodiment(s), selected portions of the system for altering an operational aspect of a mobile electronic device are implemented in hardware and software. The hardware portion of the invention can be implemented using specialized hardware logic. The software portion can be stored in a memory and be executed by a suitable instruction execution system (microprocessor). The hardware implementation of the system for altering an operational aspect of a mobile electronic device can include any or a combination of the following technologies, which are all well known in the art: a discrete logic circuit(s) having logic gates for implementing logic functions upon data signals, an application specific integrated circuit (ASIC) having appropriate logic gates, a programmable gate array(s) (PGA), a field programmable gate array (FPGA), etc.

The software portion of the invention is referred to below as the location interpretation software. As will be described in further detail below, the location interpretation software reacts to the output of a sensor based upon the location of the mobile electronic device and/or the proximity of the mobile electronic device to a particular mounting or carrying apparatus. The location interpretation software of the invention, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

FIG. 1 is a block diagram illustrating a mobile electronic device 100 constructed in accordance with an embodiment of the invention. The mobile electronic device 100 generally includes a microprocessor 126 coupled to a memory element 180 via connection 162. The microprocessor 126 is also coupled to a display element 102 via connection 104, a digital signal processor (DSP) 134 via connection 136, and a power source 157 via connection 159. The display element 102, if illuminated, may include an illumination element 103.

The memory element 180 can include any one or a combination of volatile memory elements (e.g., random access memory (RAM), such as DRAM, SRAM, etc.) and non-volatile memory elements (e.g., RAM, ROM, harddrive, tape, CDROM, etc.). Moreover, the memory element 180 may incorporate electronic, magnetic, optical, and/or other types of storage media. Note that the memory element 180 can have a distributed architecture, where various components are situated remote from one another, but are accessible by the microprocessor 126.

The microprocessor 126 can be any special purpose or general purpose processor capable of executing the instructions contained in the software (to be described below) contained within memory element 180.

The mobile electronic device 100 also includes a user input element 128 that is coupled to the microprocessor 126 via connection 132. The user input element 128 can be, for example but not limited to, a keypad, stylus and screen, a trackball, a touch-sensitive pad, a finger actuated pointer device, a microphone, such as microphone 106, (optionally shown coupled to the user input element 128 through a voice coder/decoder (codec) 112 via connection 138), or any other interface for communicating user commands to the microprocessor 126. For example, if the mobile electronic device 100 is a cellular-type mobile telephone, the user input element may include a keypad for entering alphanumeric characters. If the mobile electronic device 100 is, for example, a PDA, then the user input element might be a combination of a keypad, mouse, and a stylus for marking notations on an input screen.

The mobile electronic device 100 also includes an audio subsystem 122 and a speaker 116. The audio subsystem 122 is coupled to the microprocessor 126 via connection 124 and supplies an audio signal on connection 118 to the speaker 116. If the mobile electronic device 100 is a portable communication handset, the speaker 116 might be the speaker that the user places to his or her ear in order to listen to a voice conversation. If the mobile electronic device is a PDA, then the speaker 116 might provide audible output to the user. Furthermore, although omitted for simplicity, the audio subsystem 122 may also provide an interface to a headset type speaker device while the user input element 128 may provide an interface to a microphone so that the mobile electronic device 100 can be used with a portable headset.

If the mobile electronic device 100 is, for example, a portable cellular-type telephone handset, then it will also include a microphone 106, a voice coder/decoder (codec) 112 and a transceiver element 160. The microphone 106 is coupled to the voice codec 112 via connection 108. The microphone converts audible sound energy into an electrical signal that is processed by the voice codec 112 and forwarded via connection 114 to the microprocessor 126. The microprocessor 126 processes the input on connection 114 as known to those having ordinary skill in the art.

The DSP 134 is coupled to the transceiver element 160 via connection 174. Connection 174, while shown as two bi-directional communication lines, may also include the digital-to-analog and analog-to-digital conversion required to transmit and receive information using the transceiver element 160 (omitted from FIG. 1 for simplicity). The transceiver element 160 includes a radio frequency (RF) modem 162, coupled via connections 168 and 172 to RF electronics element 166. The RF electronics element 166 represents one or more components that process a modulated RF transmit signal received from the RF modem 162 via connection 172 and provide a received RF signal to the RF modem 162 via connection 168. The RF electronics element 166 couples to the antenna 167 via connection 169. The RF electronics element 166 includes the components necessary to upconvert, transmit, receive and downconvert an RF signal. The RF modem 162 modulates the RF signal prior to sending the signal to the RF electronics element 166 and demodulates a received signal from the RF electronics element 166.

As mentioned above, if the mobile electronic device 100 is a cellular-type telephone, then the transceiver element 160 includes all the necessary elements in order to receive a digital-to-analog converted signal via connection 174 and transmit that information using radio frequency energy. Similarly, the transceiver element 160 also includes all the circuitry necessary for receiving a radio frequency signal, and providing that signal via connection 174, for analog-to-digital conversion, to DSP 134 and then to the microprocessor 126.

In accordance with an embodiment of the invention, the mobile electronic device 100 includes a sensor 152 coupled to the microprocessor 126 via connection 158. The sensor 152 couples via connection 154 to a mating element 156. The sensor 152 and the mating element 156 comprise a location interpretation element 150 that operates to allow the mobile electronic device 100 to determine its location and to alter one or more operational aspects and parameters of the mobile electronic device 100 based on the location of the mobile electronic device 100. For example, but not limited to, the mating element 156 might be a battery charger, a belt clip, a belt pouch, a car clip, a car carrier, a clothing carrier (such as, for example, a shirt pocket accessory), etc. The sensor 152 may comprise any type of sensing device that determines whether it is coupled to a mating element 156, and if so coupled, determines the nature of the mating element 156 to which it is coupled. The sensor 152 develops a signal based on, and determined by whether it is coupled to a mating element 156, and if so coupled, the nature of the mating element 156 to which it is coupled. The sensor 152 develops a unique signal based upon the type of mating element 156 to which it is coupled, and delivers that unique signal to the microprocessor 126.

When the sensor 152 determines that it is not coupled to a mating element 156, the sensor 152 develops a signal that is communicated to the microprocessor 126 via connection 158. This signal instructs the microprocessor that the mobile electronic device 100 is not coupled to a mating element. Regardless of whether coupled to a mating element 156, the sensor 152 develops a signal that is sent to the microprocessor 126, instructing the microprocessor to set or alter one or more operational aspects of the mobile electronic device 100 based upon the unique signal. Such operation will be described in greater detail below.

The sensor 152 may comprise any type of mechanical or electrical sensing device or apparatus that can determine whether the sensor is coupled to a mating element 156, and if so coupled, can determine the nature of the mating device 156 to which it is coupled. For example, the sensor 152 might be a magnetic switch, a physical contact switch, one or more mechanical mating pins, an optical sensor, a density sensor, or a smart tag type sensor. A smart tag type sensor is one that detects different mating elements using an intelligent control logic. In use, depending upon the mating element 156 to which the sensor 152 is coupled, the sensor 152 will develop a signal specific to and corresponding to the mating element 156, and forward that signal via connection 158 to the microprocessor 126. Depending upon the signal received from the sensor 152, the microprocessor 126 will execution the location interpretation software 200 (to be described below) located in the memory element 180. The location interpretation software 200 in the memory element 180 will execute a software routine corresponding to the signal received from the sensor 152 (based upon the location of the mobile electronic device 100) and invoke a corresponding configuration Table 250 (to be described below) based upon the location of the mobile electronic device 100 determined by the sensor 152.

The software in memory 180 may include one or more separate programs, each of which comprise one or more code segments, which are an ordered listing of executable instructions for implementing logical functions. In the example of FIG. 1, the software in the memory element 180 includes an operating system 182, application software 184, and location interpretation software 200. The application software 184 is executed by the microprocessor 126 in order to perform task specific operations of the mobile electronic device 100. The location interpretation software 200 includes the software code segments that are executed by the microprocessor 126 to determine whether the sensor is coupled to a mating element 156, and if so coupled, to determine the nature of the mating element 156 so that the operation of the mobile electronic device 100 may be adjusted accordingly.

With respect to the operating system 182, any available operating system that can be used to execute the normal functionality of the mobile electronic device 100 can be used. For example, if the mobile electronic device 100 is a PDA, a suitable operating system might be the Windows CE operating system, available from Microsoft Corporation of Redmond, Wash. If the mobile electronic device 100 is a cellular-type mobile communication device, then the operating system 182 may be a proprietary operating system designed by the manufacturer of the device 100.

The memory 180 also includes one or more configuration tables, hereinafter collectively referred to using reference numeral 250. The configuration Tables 250, which can comprise both volatile data 186 and non-volatile data 188, are the tables that are stored in the memory element 180 and that are invoked by the location interpretation software 200 in accordance with the sensor signal detected by the sensor 152. The configuration Tables 250 may include ones that are not user configurable (non-volatile) and ones that are user configurable (volatile). During operation of the mobile electronic device 100, a particular configuration table might be invoked if the sensor 152 determines that the mating element is a battery charger, while a different configuration Table 250 may be invoked if the sensor 152 determines that the mating element is a belt pouch. Further, a default configuration table may be selected if the location interpretation element 150 is disabled, or if the sensor 152 determines that the mobile electronic device 100 is not coupled to a mating element 156.

Figure 2:
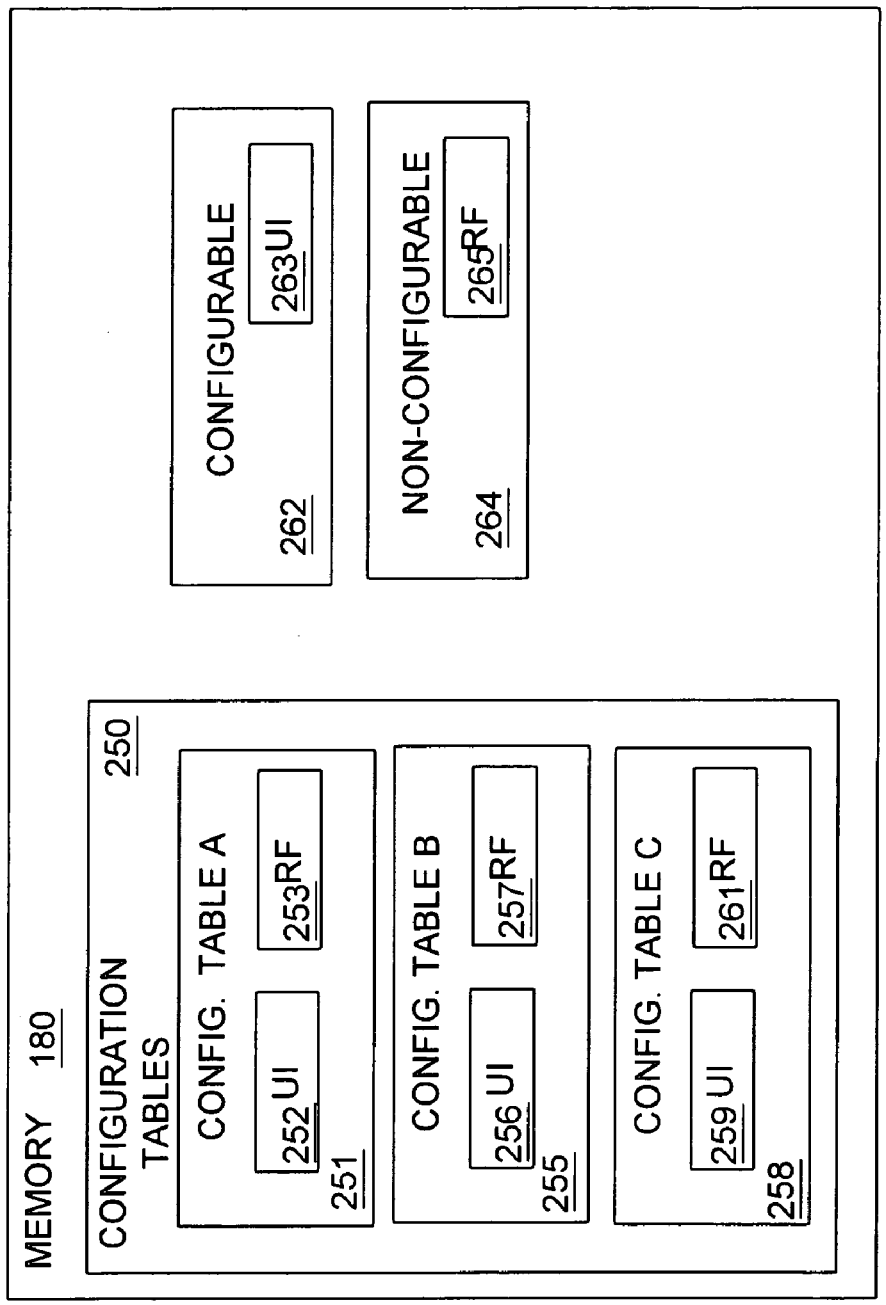
FIG. 2 is a block diagram illustrating portions of the memory of FIG. 1.

FIG. 2 is a block diagram illustrating portions of the memory element 180 of FIG. 1. The memory element 180 in FIG. 2 illustrates one example of the manner in which the memory 180 can be configured and the location interpretation software 200 implemented. In the example shown in FIG. 2, the memory element 180 includes the configuration Tables 250 of FIG. 1. The memory element 180 also includes, as separate tables, a configurable table 262 and a non-configurable table 264, which will be described in greater detail below. Optionally, location dependant behavior may be implemented as separate code paths within the software or retrieved from other sources in other formats, such as over the air, memory cards, etc.)

The configuration Tables 250 include, in this example, configuration Tables 251, 255 and 258. In this example, the configuration Tables 251, 255 and 258 each include user interface information configuration and, if the mobile electronic device 100 is a portable communication handset, RF configuration information. For example, the configuration Table 251, includes user interface configuration information 252 and RF configuration information 253. Similarly, the configuration Table, 255 includes user interface configuration information 256 and RF configuration information 257; and the configuration Table 258 includes user interface configuration information 259 and RF configuration information 261. The user interface configuration information and the RF configuration information determine, for each Table, the user interface and the RF characteristics that the mobile electronic device 100 will exhibit when one of the configuration tables is selected by the location interpretation software 200 and executed in the microprocessor 126 (FIG. 1).

The configuration Tables 251, 255 and 258 are invoked by the microprocessor 126 depending on the location of the mobile electronic device 100 or the proximity of the mobile electronic device 100 to a mounting or carrying mechanism. For example, one of the configuration Tables 250 will be invoked depending on the placement of the mobile electronic device 100 in a mating element 156. Referring again to FIG. 1, and for exemplar purposes only, if the sensor 152 determines that the mobile electronic device 100 is not coupled to a mating element 156 then configuration Table 251 might be selected. In such an instance, a particular user interface model and a particular RF model determined by the user interface configuration information 252 and the RF configuration information 253 might be selected. For example, if the sensor 152 indicates that the mobile electronic device 100 is not coupled to a mating element 156, then, assuming that the mobile electronic device 100 is a portable communication handset, the location interpretation software 200 will invoke the configuration Table 251 which may include an RF configuration 253 that limits the amount of RF energy emitted by the mobile electronic device 100.

Conversely, if the sensor 152 indicates that the mobile electronic device 100 is indeed coupled to a mating element 156, and, for example, that the mating element 156 is a belt clip, then the location interpretation software 200 might invoke configuration Table 255, which includes a set of user interface 256 and RF 257 parameters, invoked when the mobile electronic device 100 is located in a belt clip. It should be understood that the configuration examples listed are for exemplar purposes only. For example, if the mobile electronic device 100 is a PDA, there would likely be no RF characteristics in the configuration tables. Further, the selection of a configuration Table that corresponds to a particular signal from the sensor 152 is arbitrary.

In addition to the predefined configuration Tables 250, the memory element 180 may also optionally include a user configurable Table 262 and a non user-configurable Table 264. For example, the user configurable Table 262 might enable the user to enter specific operating parameter information into the user input element 128 (FIG. 1) so that the user may alter one or more operational aspects of the user interface associated with the mobile electronic device 100. Conversely, the non user-configurable Table 264 might be located in a protected memory location and include information that is "built-in" to the device. In this manner, a portion of the available configuration parameters might be configurable (262) by the user while another portion of the configuration parameters might not be user-configurable (264).

Figure 3:
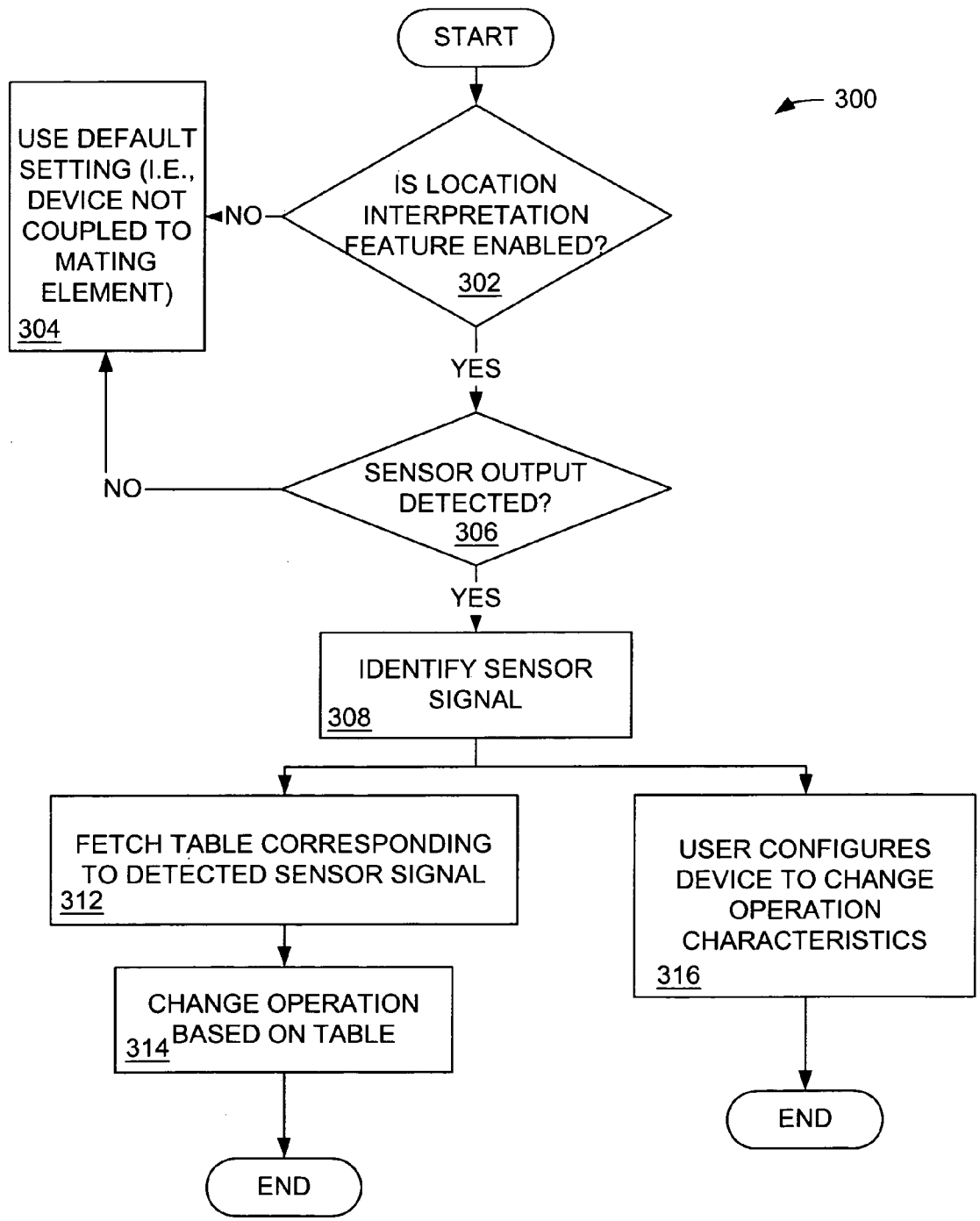
FIG. 3 is a flow chart illustrating the operation of certain embodiments of the invention.

FIG. 3 is a flow chart 300 illustrating the operation of certain embodiments of the invention. Any process descriptions or blocks in flow charts should be understood as representing modules, segments, or portions of code which may include one or more executable instructions for implementing specific logical functions or steps in the process. Alternative implementations are included within the scope of the preferred embodiment of the invention in which functions may be executed out of order from that shown or discussed, including substantially concurrently or in reverse order, depending on the functionality involved, as would be understood by those reasonably skilled in the art of the invention.

In block 302, the microprocessor 126 determines whether the location interpretation feature is enabled. If the microprocessor determines that the location interpretation feature is not enabled, then in block 304 a default setting is invoked. For example, the default setting might be a conservative operating condition that is selected if the location interpretation feature is not enabled, or if the sensor 152 determines that the mobile electronic device 100 is not coupled to a mating element 156. If the mobile electronic device 100 is a portable communication handset, a conservative RF profile might be selected, assuming that the device is held against the user's ear. Such a default setting may be invoked by the microprocessor 126 invoking the location interpretation software 200 to select a default configuration Table 250.

In block 302, if it is determined that the location interpretation feature is enabled, then, in block 306, the microprocessor 126 determines whether an output is detected from the sensor 152. If a sensor output is not detected, then the process returns to block 304 where a default setting is invoked. If, however, in block 306 a sensor output is detected from the sensor 152 via connection 158 (FIG. 1), then, in block 308, the microprocessor 126 invokes the location interpretation software 200 to identify the sensor output. In essence, the microprocessor 126 determines if the sensor 152 is coupled to a mating element 156, and, if so coupled, determines the nature of the mating element 156 to which the sensor 152 is coupled.

In block 312, the microprocessor 126 fetches the appropriate configuration Table 250 from the memory element 180 based on, and corresponding to, the detected sensor output. Specifically, the microprocessor 126 executes the location interpretation software 200 to determine the sensor output and then determines the appropriate configuration Table 250 corresponding to the detected sensor output.

In block 314, the microprocessor 126 loads the appropriate configuration Table 250 and alters one or more operating characteristics and parameters of the mobile electronic device 100 based on the selected configuration Table 250. Furthermore, as mentioned above with respect to FIG. 2, and described in block 316, one or more operating parameters of the mobile electronic device 100 can also be adjusted by the user of the device 100 by entering commands via the user input element 128.

While various embodiments of the invention have been described, it will be apparent to those of ordinary skill in the art that many more embodiments and implementations are possible that are within the scope of this invention. For example, while illustrated using a portable communication handset or a PDA, the invention is applicable to any mobile electronic device. All such modifications and variations are intended to be included herein within the scope of this disclosure and the present invention and protected by the following claims.

What is claimed is:

1. A method for altering an operational aspect of a mobile electronic device, the method comprising:
   providing a sensor associated with the mobile electronic device;
   determining whether the sensor is coupled to a mating element associated with the sensor;
   developing a signal in the sensor, the signal determined by whether the sensor is coupled to and recognizes the mating element;
   receiving the signal in a processor; and
   altering a characteristic of the mobile electronic device based on the received sensor signal and based on the location of the mobile electronic device with respect to the mating element.

2. The method of claim 1, wherein the altering step alters a user interface characteristic of the mobile electronic device.

3. The method of claim 1, wherein the altering step alters a radio frequency (RF) characteristic of the mobile electronic device.

4. The method of claim 1, further comprising using a default user interface characteristic and a default radio frequency characteristic if the determining step concludes that the sensor is not coupled to the mating element.

5. The method of claim 1, further comprising altering a user interface characteristic based upon a sensor signal determined by the mating element if the determining step concludes that the sensor is coupled to a mating element.

6. The method of claim 1, further comprising altering a radio frequency (RF) characteristic based upon a sensor signal determined by the mating element if the determining step concludes that the sensor is coupled to a mating element.

7. The method of claim 5, wherein the user interface characteristic is predetermined and stored in a memory associated with the processor.

8. The method of claim 5, wherein the user interface characteristic is dynamically adjustable by a user of the mobile electronic device.

9. The method of claim 6, wherein the RF characteristic is predetermined and stored in a memory associated with the processor.

10. The method of claim 1, wherein the mating element is chosen from the group consisting of, no coupling, a belt clip, a belt pouch, a charger, a car clip, and a clothing carrier.

11. The method of claim 10, wherein the altering step alters an operational aspect of the mobile electronic device based upon whether the mobile electronic device is uncoupled from the mating element and located in any of the belt clip, the belt pouch, the charger, the car clip, and the clothing carrier.

12. A system for altering an operational aspect of a mobile electronic device, comprising:
 a sensor associated with the mobile electronic device;
 a mating element associated with the sensor, the sensor configured to develop a signal based on whether the sensor recognizes the mating element; and
 logic configured to receive the signal from the sensor and alter a characteristic of the mobile electronic device based on the received sensor signal and based on the location of the mobile electronic device with respect to the mating element.

13. The system of claim 12, wherein the sensor is decoupled from the mating element and the sensor signal causes the logic to use a default user interface characteristic and a default radio frequency (RF) characteristic.

14. The system of claim 12, wherein the sensor is coupled to the mating element and the mating element determines the sensor signal.

15. The system of claim 14, wherein the sensor signal causes the logic to alter a user interface characteristic of the mobile electronic device.

16. The system of claim 14, wherein the sensor signal causes the logic to alter a radio frequency (RF) characteristic of the mobile electronic device.

17. The system of claim 15, wherein the user interface characteristic is predetermined and stored in a memory associated with the processor.

18. The system of claim 15, wherein the user interface characteristic is dynamically adjustable by a user of the mobile electronic device.

19. The system of claim 16, wherein the RF characteristic is predetermined and stored in a memory associated with the processor.

20. The system of claim 12, wherein the mating element is chosen from the group consisting of, no coupling, a belt clip, a belt pouch, a charger, a car clip, and a clothing carrier.

21. The system of claim 20, wherein an operational aspect of the mobile electronic device is altered based upon whether the mobile electronic device is uncoupled from the mating element and located in any of the belt clip, the belt pouch, the charger, the car clip, and the clothing carrier.

22. A computer readable medium having a program for altering an operational aspect of a mobile electronic device, the program comprising logic configured to perform the steps of:
 determining whether a sensor associated with the mobile electronic device is coupled to a mating element associated with the sensor;
 developing a signal in the sensor, the signal determined by whether the sensor is coupled to and recognizes the mating element;
 receiving the signal in a processor; and
 altering a characteristic of the mobile electronic device based on the received sensor signal and based on the location of the mobile electronic device with respect to the mating element.

23. The program of claim 22, wherein the altering step alters a user interface characteristic of the mobile electronic device.

24. The program of claim 22, wherein the altering step alters a radio frequency (RF) characteristic of the mobile electronic device.

25. The program of claim 22, further comprising logic configured to perform the step of using a default user interface characteristic and a default radio frequency characteristic if the determining step concludes that the sensor is not coupled to the mating element.

26. The program of claim 22, further comprising logic configured to perform the step of altering a user interface characteristic based upon a sensor signal determined by the mating element if the determining step concludes that the sensor is coupled to a mating element.

27. The program of claim 22, further comprising logic configured to perform the step of altering a radio frequency (RF) characteristic based upon a sensor signal determined by the mating element if the determining step concludes that the sensor is coupled to a mating element.

28. The program of claim 26, wherein the user interface characteristic is predetermined and stored in a memory associated with the processor.

29. The program of claim 26, wherein the user interface characteristic is dynamically adjustable by a user of the mobile electronic device.

30. The program of claim 27, wherein the RF characteristic is predetermined and stored in a memory associated with the processor.

31. The program of claim 22, wherein the mating element is chosen from the group consisting of, no coupling, a belt clip, a belt pouch, a charger, a car clip, and a clothing carrier.

32. The program of claim 31, wherein the altering step alters an operational aspect of the mobile electronic device based upon whether the mobile electronic device is uncoupled from the mating element and located in any of the belt clip, the belt pouch, the charger, the car clip, and the clothing carrier.

* * * * *